UNITED STATES PATENT OFFICE.

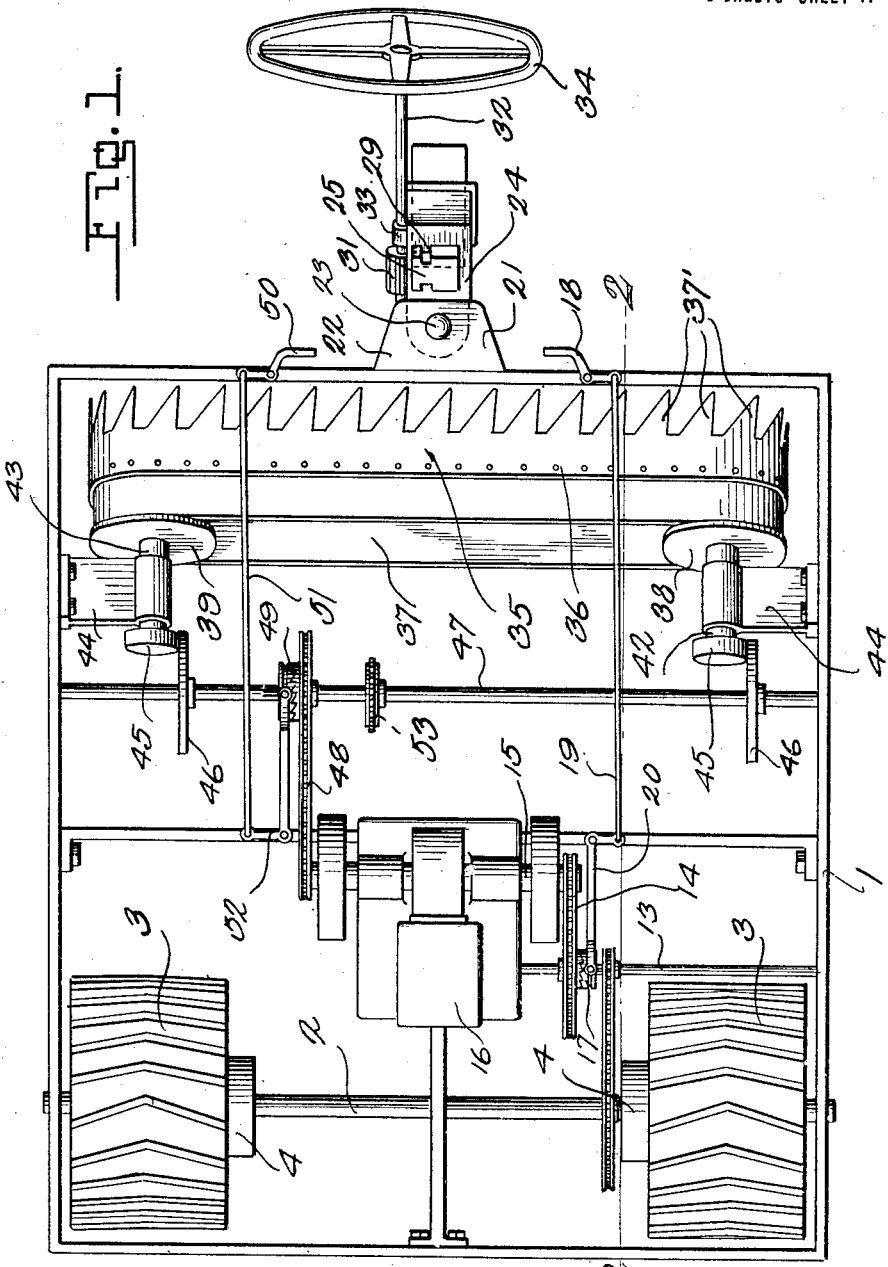

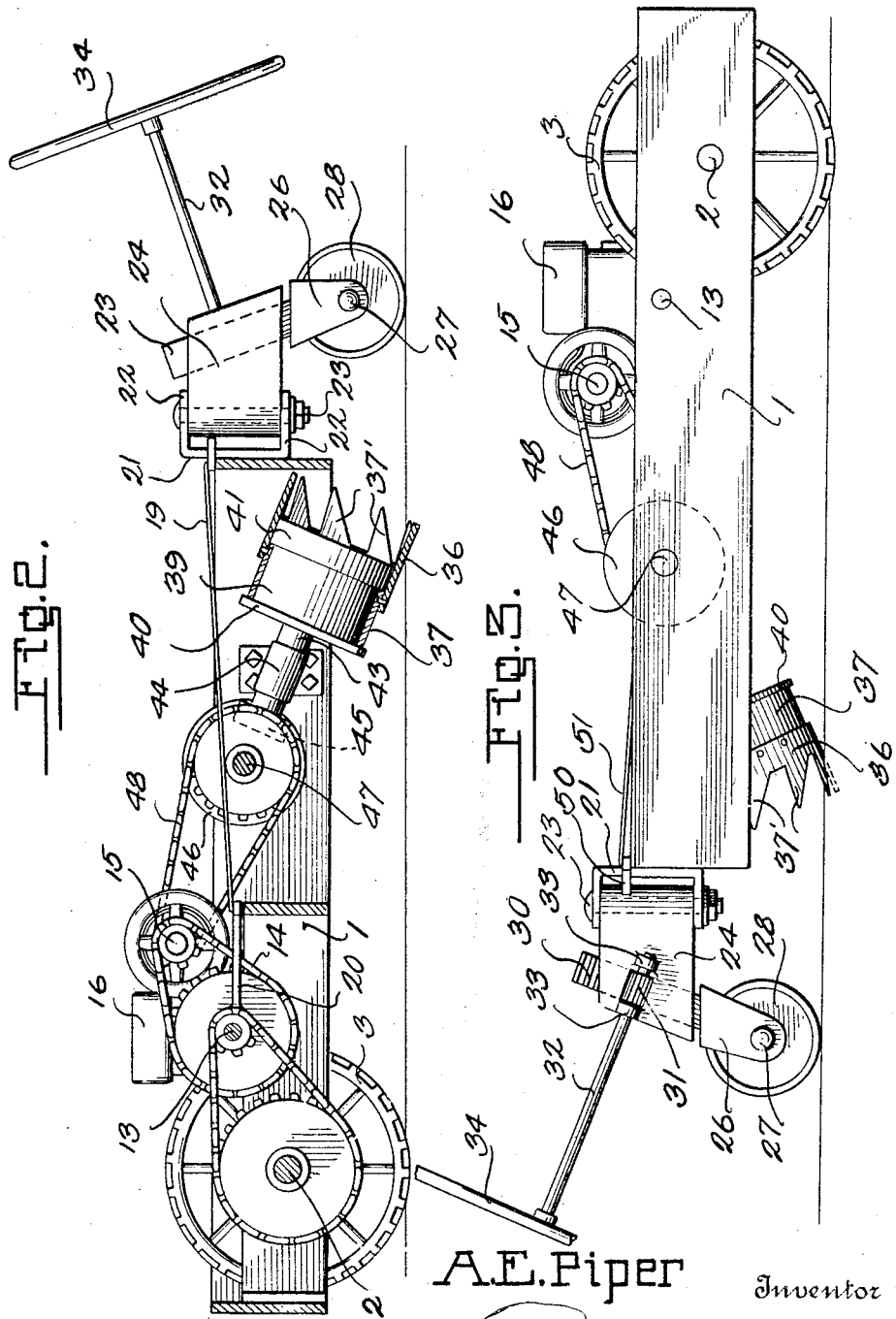

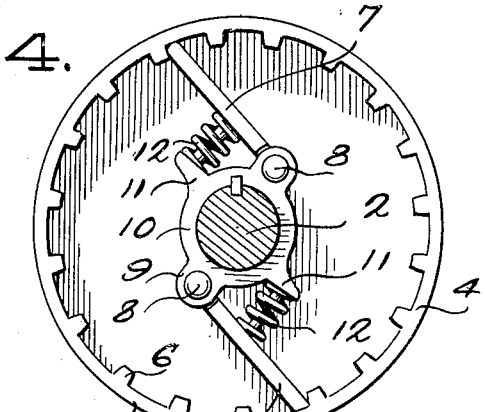
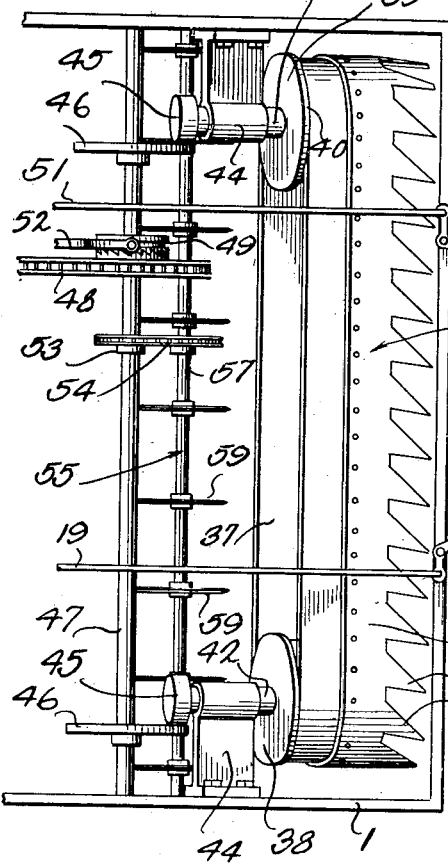

ALONZO E. PIPER, OF WHITE CITY, FLORIDA.

WEEDING-MACHINE.

1,337,721. Specification of Letters Patent. Patented Apr. 20, 1920.

Application filed October 31, 1918. Serial No. 260,520.

*To all whom it may concern:*

Be it known that I, ALONZO E. PIPER, a citizen of the United States, residing at White City, in the county of St. Lucie and State of Florida, have invented certain new and useful Improvements in Weeding-Machines, of which the following is a specification.

This invention relates to agricultural implements, and more particularly to a machine designed for exterminating weeds, and at the same time giving the growing plants a shallow or surface cultivation, an object of the invention being to provide a weed cutting machine which includes an endless or band cutter having a plurality of teeth thereon which cutter is carried by the supporting structure at an incline thereto, so that the cutting edges and points of the teeth may pass beneath the surface of the ground for cutting off the weeds practically at the junction between the stalks and roots thereof, effectively killing the weeds and preventing them from springing up after cutting, and by causing or positioning the teeth to cut or pass beneath the surface of the ground, a surface cultivation will be given to the growing plant.

A further object of this invention is to provide a weeding or weed cutting machine as specified, which comprises a supporting structure having traction wheels carried thereby, which traction wheels are operatively connected to a prime mover, such as an ordinary internal combustion engine for propelling the machine, and which prime mover is also connected to the guide pulleys of the band or endless weed cutting blades for moving the said blades transversely to the direction of movement of the supporting frame.

A further object of the invention is to provide means at the rear end of the supporting frame of the weeding machine for directing the travel of the machine and also for varying the elevation of the rear end of the machine and consequently varying the depth of insertion of the cutting point of the band cutter into the ground.

A still further object of the invention is to provide a plurality of disks or rotary colters which are positioned forwardly of the band weed cutter, for cutting up the weeds when the machine is used for killing and cutting relatively heavy weeds.

Other objects of the invention will appear in the following detailed description, taken in connection with the accompanying drawings, forming a part of this specification, and in which drawings:

Figure 1 is a top plan of the improved weeding machine.

Fig. 2 is a longitudinal section on the line 2—2 of Fig. 1.

Fig. 3 is a side elevation of the improved weeding machine.

Fig. 4 is a detailed view of a part of the power transmission mechanism.

Fig. 5 is a fragmentary top plan of a modified form of the weed cutter illustrating the disk cutters associated therewith, and Fig. 6 is a fragmentary vertical section through the modified form illustrated in Fig. 5.

Referring more particularly to the drawings, 1 indicates the main supporting frame of the weeding machine which frame carries a front axle 2. The front axle 2 has traction wheels 3 rotatably mounted thereon, the faces of which are provided with the usual type of cleats or grouters to prevent slipping or skidding of the wheels and to increase the traction power of the wheels. The axle 1 has casings 4 rotatably mounted thereon, the rims or flanges 5 of which are provided with internal teeth 6. Certain of the teeth 6 are engaged by bars 7 which are pivotally connected as shown at 8 to peripheral ears 9 formed upon a collar 10. The collar 10 is keyed to the axle 2 as clearly shown in Fig. 4 and it has a pair of radiating ears 11 carried thereby, against the flat surfaces of which the ends of coil springs 12 engage. The ends of the coil springs 12, opposite to those which engage the flat faces of the lugs or ears 11 engage against the bars 7 and the teeth fixed to the casing, which together with the bars 7 and collars 10 form a differential mechanism for transmitting rotation from the axle 2 to the wheels 3.

The axle 2 is connected, by means of any suitable power transmitting mechanism, to a shaft 13 which is in turn connected, by means of a power transmitting mechanism 14 to the main drive shaft 15 of an internal combustion engine or suitable prime mover 16. A clutch mechanism 17 is interposed in connection between the shafts 13 and 15 and it is controlled by a pivoted lever 18 carried by the rear end of the frame 1, the said lever being connected to the shiftable clutch section of the clutch mechanism 17 through the medium of a rod 19 and a bell crank lever 20, thus the rotation of the axle 2 by the operation of the prime mover 16 may be controlled from the rear end of the machine from where the machine is steered or guided.

The rear end of the supporting frame 1 has the yoke or bracket 21 connected thereto, providing a pair of spaced horizontal arms 22 which rotatably support a suitable pin 23. The pin 23 extends through the barrel of a casting 24. The casting 24 is provided with an angled opening extending therethrough, in which the stem 25 of the rear wheel construction slidably extends. The stem 25 has a yoke 26 upon its lower end which rotatably supports an axle 27 upon which the rear supporting wheel 28 of the machine is mounted. The casting 24 is provided with lugs 29 extending along each side of the opening therein which lugs are seated in grooves formed in the stem 25. The said stem 25 has ratchet teeth as indicated at 30 formed along one side of the same which mesh with a pinion 31. The pinion 31 is carried by the steering post 32, for rotation therewith and it meshes with the ratchet teeth 30 for varying the elevation of the wheels 28 upon rotation of the steering post 32. This steering post 32 is rotatably supported by suitable brackets 33, formed upon the side of the casting 34 and it has a relatively large steering wheel 34 mounted upon its outer end by means of which the steering post may be rotated. The pin 23 pivotally connects the casting 24 to the brackets 21 in such manner as to permit lateral movement of the casting and consequently of the wheel 28 by swinging movement of the steering wheel 34 and post 32 about the pin 23 as an axis, thereby permitting the lateral guiding or steering of the weed cutting machine.

The raising or lowering of the wheel 28 will vary the elevation of the weed cutter or cutting mechanism generically indicated by the numeral 35.

The weed cutting mechanism 35 comprises a band or endless cutting blade 36 which is preferably formed of saw steel, having a plurality of relatively large cutting teeth 37 formed upon its lower edges. The band 36 is riveted or otherwise suitably connected to the lower edge of a leather or analogous belt 37 and this belt passes about spaced pulleys 38 and 39 which are positioned near the lateral edges or sides of the supporting frame 1, as clearly shown in Fig. 1 of the drawings. The pulleys 39 are provided with flanges 40 upon their upper ends which prevent the belt 38 from creeping off the upper ends of the pulleys and they are also provided with flanges 41 on their lower edges which are relatively wide and against the upper edges of which the lower edge of the belt 37 engages. The band 36, passes about the peripheries of the flanges 41, as clearly shown in Fig. 2 of the drawings.

The pulleys 38 and 39 are carried by the shafts 42 and 43 respectively, which shafts are supported by suitable bearings 44. Friction pinions 45 are mounted upon the shafts 42 and 43 and they frictionally engage the surfaces of friction disks 46 which are carried by the shaft 47. The shaft 47 is operatively connected, by means of suitable power transmitting means 48 with the main shaft 15 of the prime mover 16 and a clutch mechanism 49 is interposed in said connection, the shiftable section of which structure is operated by the operation of a hand lever 50, through the medium of a rod 51 and bell crank 52. The lever 50, like the lever 18 is carried in the rear end of the supporting frame 1, so that it can be conveniently operated by the operator of the device.

A shaft 47 has a sprocket 53 mounted thereon about which the sprocket chain 54 is adapted to pass, when the weed cutting colter construction generically indicated by the numeral 55 is used in connection with the band or endless cutter structure 35. The weed cutting mechanism 55 comprises the shaft 56 which is detachably connected to a supporting frame 1 and which has a sprocket 57 mounted thereon about which the sprocket chain 54 passes. The supporting bearings indicated in dotted lines at 58 in Fig. 6 of the drawings, are constructed so as to permit disconnection between the supporting frame 1 and the shaft 56, if it is desired to use the endless band cutter structure 35 independently of the rotary cutter structure 55. The shaft 56 has a plurality of cutting disks 59 mounted thereon at spaced distances along its length, the peripheries of which disks are sharpened for engaging and cutting weeds in comparatively small pieces assisting in the effective killing of the weeds.

By particular reference to Figs. 2 and 3 of the drawings, it will be noticed that the cutting mechanism 35 inclines rearwardly and away from the direction of travel of the machine, causing the rearmost portions of the points 37' thereof to be inserted the greater distance into the ground, whereby they will cut the soft root part of the weeds while the heavier part thereof, near the surface of the ground, will be cut by the thicker, or rather wider portions of the teeth, consequently relieving the strain upon the weakest portion of the teeth and tending to prevent bending or breaking of the points of the teeth. The machine is preferably made small enough so that one man walking rearwardly of the same can readily manipulate it through the medium of the hand wheel 34 and steering post 32, to properly guide it between the rows of growing plants, or about small trees, bushes or the like, to effectively cut and kill the weeds as well as making the surface cultivation of the soil. The device is propelled by the operation of the prime mover 16, and this prime mover also serves as propelling means for the operating pulleys 38 and 39 of the endless cutter structure 35 moving this cutting structure transversely to the direction of travel of the body frame of the machine and the teeth of this cutting structure will engage into the ground, beneath the surface thereof, and cut up the root portions of the weeds, preventing them from growing after they have once been cut, and in case the weeds are heavy, or large, the rotary cutting mechanism 55 may be used for cutting up the stalks of the weed, prior to the cutting of the root thereof by the band or endless cutting mechanism 55. The adjustment of the rear end of the machine, through the medium of the adjustment of the wheel 38 will permit regulation of the depth of insertion of the teeth 37′ into the ground and the frictional connection between the shaft 47 and shafts 42 and 43 will be maintained, under different adjustments of the rear portion of the frame.

Changes in details may be made without departing from the spirit of this invention, but;

I claim:

1. In a weed cutting machine, the combination, of a supporting frame, an endless cutter having cutting teeth formed upon one edge portion thereof and being positioned at an acute angle to the horizontal, the points of teeth extending toward the rear of said supporting frame.

2. In a weed cutting machine, the combination, of a supporting frame, parallel shafts journaled on the frame, means for rotating said shaft, flanged pulleys on said shaft, a belt passing about said pulleys, a band cutter riveted to said belt near one edge and cutting teeth formed upon one edge of the band cutter.

3. In a weed cutting machine, the combination of a supporting frame, parallel shafts journaled on said frame and positioned at an acute angle to the horizontal, means for rotating said shaft, flanged pulleys on said shaft, a belt passing about said pulleys, a band cutter riveted to said belt near one edge, cutting teeth formed upon the rear edge of said cutter and extending toward the rear end of the machine, said teeth extended beyond the lower end of the pulleys and adapted to be inserted beneath the surface of the soil over which the machine is traveling.

4. In a weed cutting machine, the combination, of a supporting frame, parallel shafts journaled on said frame and positioned at an acute angle to the horizontal, means for rotating said shaft, flanged pulleys on said shaft, a belt on said pulleys and engaging the pulleys between the flanges thereof, the lowermost flanges of said pulley being relatively wide, an endless cutter of flexible steel riveted to said belt near its lower edge and riding over the periphery of said relatively wide lower flanges, and cutting teeth formed along the lower edge of said endless cutter and extended beyond the lower end of the pulleys.

5. In a weed cutting machine, the combination with a driving mechanism of an endless cutter, a rotary cutter positioned forwardly of said endless cutter, means for operating said cutters by said driving mechanism.

6. In a weed cutting machine, the combination with a driving mechanism, of an endless cutter positioned at an acute angle to the horizontal and having the cutting edges extending rearwardly, a rotary cutter positioned forwardly of said endless cutter, and means for operating said cutters by said driving mechanism.

7. In a weed cutting machine, the combination, with a driving mechanism, of an endless cutter positioned at an acute angle to the horizontal, said endless cutter inclining toward the rear of the machine and having cutting teeth formed upon its rear edge, said teeth adapted to be inserted beneath the surface of the ground over which the machine is traveling, a rotary cutter positioned forwardly of said endless cutter, and means for operating said cutters by said driving mechanism.

8. In a weed cutting machine, the combination, of a supporting frame, a driving mechanism carried by said supporting frame, parallel shafts journaled on said frame and positioned at an acute angle to the horizontal, means for rotating the said shaft by the operation of said driving mechanism, flanged pulleys on said shaft, an endless cutter passing about said pulleys, said endless cutter inclining toward the rear of said supporting frame and having cutting teeth formed upon its rear edge, said teeth adapted to be inserted beneath the surface of the ground over which the machine is traveling, a rotary cutter positioned forwardly of said endless cutter, and means for operating said rotary cutter by the driving mechanism.

9. In a weed cutting machine, the combination of a supporting frame, a driving mechanism carried by said supporting frame, parallel shafts journaled on said frame and positioned at an acute angle to the horizontal, means for rotating said shaft by said driving mechanism, flanged pulleys on said shaft, an endless cutter passing about said pulley, said endless cutter inclining toward the rear of the machine, and having cutting teeth formed upon the rear edge, said teeth extended beyond the lower ends of said pulleys and adapted for insertion beneath the surface of the ground over which the machine is traveling.

10. In a weed cutting machine, the combination, of a supporting frame, a driving mechanism carried by said supporting frame, parallel shafts journaled on said frame and positioned at an acute angle to the horizontal, means for rotating said shaft by said driving mechanism, flanged pulleys on said shaft, an endless cutter passing about said pulley, said endless cutter inclining toward the rear of the machine, and having cutting teeth formed upon the rear edge, said teeth extended beyond the lower end of said pulleys and adapted for insertion beneath the surface of the ground over which the machine is traveling, means carried by said supporting frame for varying the elevation of said endless cutter and for controlling the direction of travel of said frame.

11. In a weed cutting machine, the combination of a frame, driving means carried by said frame, an endless cutter, a rotary cutter positioned forwardly of said endless cutter, means for operating said cutters by said driving mechanism, means carried by said frame for varying the elevation of the rear end thereof and for controlling the direction of travel of the frame.

12. In a weed cutting machine, the combination, of a supporting frame, an endless cutter carried by the frame, a shaft detachably carried by the frame forwardly of said endless cutter, a plurality of cutting disks carried by said shaft, and means for rotating said shaft and operating said endless cutter.

13. In a weed cutting machine, the combination, of a supporting frame, a driving mechanism carried by said supporting frame, an endless cutter positioned at an acute angle to the horizontal and having its cutting edges extending rearwardly, a shaft detachably and rotatably carried by the frame forwardly of said endless cutter, a plurality of cutting disks carried by said shafts, and means for operating said endless cutter and rotating said shafts by said driving mechanism.

14. In a weed cutting machine, the combination, of a supporting frame, a driving mechanism carried by said supporting frame, an endless cutter carried by the supporting frame and positioned at an acute angle to the horizontal, said endless cutter inclining toward the rear of the supporting frame and having cutting teeth formed upon its rear edge, said teeth adapted to be inserted beneath the surface of the ground over which the machine is traveling, a shaft detachably and rotatably carried by the supporting frame forwardly of said endless cutter, a plurality of cutting disks carried by said shafts, and means for operating said endless cutter and rotating said shaft by said driving mechanism.

ALONZO E. PIPER.